United States Patent
Hou et al.

(10) Patent No.: US 9,112,407 B2
(45) Date of Patent: Aug. 18, 2015

(54) QUASI-RESONANT DEVICE AND SYSTEM AND METHOD FOR QUASI-RESONANT CONTROL OF SWITCHING POWER

(71) Applicants: SHENZHEN BYD AUTO R&D COMPANY LIMITED, Shenzhen (CN); BYD COMPANY LIMITED, Shenzhen (CN)

(72) Inventors: Yongjun Hou, Shenzhen (CN); Xiaohua Yang, Shenzhen (CN)

(73) Assignees: Shenzhen BYD Auto R&D Company Limited, Shenzhen (CN); BYD Company Limited, Shenzhen (CN)

( * ) Notice: Subject to any disclaimer, the term of this patent is extended or adjusted under 35 U.S.C. 154(b) by 209 days.

(21) Appl. No.: 13/914,099

(22) Filed: Jun. 10, 2013

(65) Prior Publication Data

US 2013/0329465 A1    Dec. 12, 2013

(30) Foreign Application Priority Data

Jun. 11, 2012   (CN) .......................... 2012 1 0190776

(51) Int. Cl.
  *H02M 1/14*    (2006.01)
  *H02M 3/335*   (2006.01)
  *H02M 1/42*    (2007.01)
  *H02M 1/00*    (2007.01)

(52) U.S. Cl.
  CPC .............. *H02M 1/14* (2013.01); *H02M 1/4258* (2013.01); *H02M 3/33507* (2013.01); *H02M 2001/0058* (2013.01); *Y02B 70/126* (2013.01); *Y02B 70/1433* (2013.01); *Y02B 70/1491* (2013.01)

(58) Field of Classification Search
  CPC ........................... H02M 1/14; H02M 3/33507
  See application file for complete search history.

(56) References Cited

U.S. PATENT DOCUMENTS

| | | | | |
|---|---|---|---|---|
| 7,352,596 | B2* | 4/2008 | Cheng | 363/24 |
| 8,957,645 | B2* | 2/2015 | Glovinski | 323/259 |
| 8,976,546 | B2* | 3/2015 | Wang et al. | 363/21.12 |
| 2012/0320638 | A1* | 12/2012 | Boysen et al. | 363/21.02 |

* cited by examiner

*Primary Examiner* — Emily P Pham
(74) *Attorney, Agent, or Firm* — David D. Brush; Westman, Champlin & Koehler, P.A.

(57) ABSTRACT

A quasi-resonant device for a switching power, a quasi-resonant system for a switching power, and a method for a quasi-resonant control of a switching power are provided. The quasi-resonant device includes: a degaussing time sampling module, configured to sample a degaussing time $T_{ds}$ of a secondary coil of the transformer according to a feedback signal output by the switching power after the switching tube is turned off; a valley sampling module, configured to sample a resonant valley signal of the quasi-resonant module according to the feedback signal; a time producing module, configured to produce a time T with a predetermined ratio D by processing the degaussing time $T_{ds}$; and a logic processing module, configured to obtain a first valley signal after the time T, and the first valley signal works as a switching signal T' to turn on the switching tube.

16 Claims, 7 Drawing Sheets

QUASI-RESONANT DEVICE AND SYSTEM AND METHOD FOR QUASI-RESONANT CONTROL OF SWITCHING POWER

CROSS-REFERENCE TO RELATED APPLICATION

This application claims priority to and benefits of Chinese Patent Application Serial No. 201210190776.5, filed with the State Intellectual Property Office of P. R. China on Jun. 11, 2012, the entire content of which is incorporated herein by reference.

FIELD

The present application relates to a switching power, more particularly to a quasi-resonant device for a switching power, a quasi-resonant system for a switching power, and a method for a quasi-resonant control of a switching power.

BACKGROUND

As portable electric devices are more and more popular nowadays, a switching power has become the primary power scheme in these portable electric devices. Currently, a low-power AC/DC (alternating current/direct current) switching power always applies a primary control to replace an expensive secondary control (comprising a TL431 and an optical coupler). For example, FIG. 1 illustrates an adapter of a typical primary control switching power, in which after passing a full wave rectifier (i.e. the rectifier bridge consisting of diodes D1, D2, D4, and D5) and a π type filter circuit consisting of capacitors C2, C3 and an inductor L1, an AC voltage is converted into a high-voltage DC voltage to supply a start voltage for the control chip IC1 and to provide energy for the primary coil power loop after the chip IC1 is turned on. The PWM (Pulse Width Modulation) chip IC1 controls a turn-on time of a switching tube such as MOSFET (Metal-Oxide-Semiconductor Field-Effect Transistor, MOS tube for short) by sampling a voltage dividing signal of an auxiliary winding (the feedback voltage dividing network consisting of resistors R2, R3) and processing the voltage dividing signal by EA (Error Amplifier) in the interior of the PWM chip IC1 to generate a control signal, so as to adjust an input power to accommodate a change in the load. A resistor R4 is used for detecting a peak current of the primary coil of the transformer, D3 and C1 form a secondary rectifier filter network, and R1 is a fictitious load resistor. A conventional control chip adopts a control mode of PWM or PFM (Pulse Frequency Modulation), which provides good constant voltage and constant current output properties, but has limitations in the efficiency and EMI (Electro-Magnetic Interference). The chip IC1 comprises pins as follows:

VDD—external power terminal;
GND—ground terminal;
Isense—terminal for detecting peak current;
Vsense—terminal for feeding back output voltage;
OUT—output driving terminal.

With more and more focus on the energy and the environment, currently there are higher requirements of the switching power for the efficiency and EMI. For example, as shown in FIG. 2, a QR (Quasi-Resonant) circuit comprises a buffer capacitor $C_{oss}$, also called resonant capacitor which mainly comprises an output capacitor of an MOS tube M0 and a parasitic capacitor of the transformer. When the MOS tube M0 is turned on (Ton), the input voltage $V_{IN}$ is applied to the primary coil $L_m$, and a current $I_{ds}$ of the MOS tube M0 increases linearly from zero to a peak value $I_{pk}$. During this time period (Ton), the energy is stored in the primary coil $L_m$ and represented by a formula of $(L_m*I_{pk}*I_{pk})/2$. When the MOS tube M0 is turned off, the energy stored in the primary coil $L_m$ causes a rectifier diode D3 at the secondary output terminal to be turned on. During the time period ($T_{ds}$) when the diode D3 is on, the output voltage $V_o$ is applied to the secondary coil, a current of the rectifier diode D3 decreases linearly from a peak value $I_{pk}*N_p/N_s$, and the input voltage $V_{IN}$ and a voltage $V_o*N_p/N_s$ fed back to the primary coil from the secondary coil overlap onto the MOS tube M0, where $N_p$ is a number of turns of the primary coil of the transformer, and $N_s$ is a number of turns of the secondary coil of the transformer.

In conjunction with FIG. 2, FIG. 3 illustrates waves of each node during the operation process of the quasi-resonant circuit, in which $I_p$ is a wave of a current passing the primary MOS tube M0, $I_s$ is a wave of a current passing the secondary diode D3, and $V_{DS}$ is a wave of a voltage between two terminals of the MOS tube M0. When the current of the diode decreases to zero, the voltage $V_{DS}$ of the MOS tube M0 starts to resonate with an amplitude of $V_o*N_p/N_s$ by the primary coil $L_m$ and the output capacitor $C_{oss}$ of the MOS tube M0. In that way, a switching loss caused by the capacitance between a drain and a source can be reduced, which is also named ZVS (Zero Voltage Switch) or LVS (Low Voltage Switch). At the same time, smaller voltage change rate dv/dt also improves an effect of EMI.

As described above, the conventional switching power has the following disadvantages: 1) the ZVS or LVS cannot be achieved by the conventional PWM, so the switching loss is huge and the EMI effect is poor; 2) although QR control may realize the ZVS or LVS, when an output load is reduced or an input voltage is increased, turn-on time Ton of the MOS tube may reduce which leads to an increase in a switching frequency, thus causing problems like a significant switching loss, an intermittently switching and a noise.

SUMMARY

Embodiments of the present disclosure seek to solve at least one of the problems existing in the prior art to at least some extent.

According to a first aspect of the present disclosure, a quasi-resonant device for a switching power is provided. The switching power comprises a transformer, a quasi-resonant module and a switching tube. The quasi-resonant device comprises: a degaussing time sampling module, configured to sample a degaussing time $T_{ds}$ of a secondary coil of the transformer according to a feedback signal output by the switching power after the switching tube is turned off; a valley sampling module, connected with the degaussing time sampling module, and configured to sample a resonant valley signal of the quasi-resonant module according to the feedback signal; a time producing module, connected with the degaussing time sampling module, and configured to produce a time T with a predetermined ratio D by processing the degaussing time $T_{ds}$; and a logic processing module, connected with the valley sampling module and the time producing module respectively, and configured to obtain a first valley signal after the time T, in which the first valley signal works as a switching signal T' to turn on the switching tube.

With the quasi-resonant device according to embodiments of the present disclosure, a zero-voltage switching can be realized, which improves the switching efficiency and improves the effect of EMI. In addition, a number of external filter elements is reduced, which reduces the manufacturing cost. Moreover, problems of the switching loss and the noise caused by a high frequency can be also avoided.

According to a second aspect of the present disclosure, a quasi-resonant system for a switching power is provided. The switching power comprises a transformer, a quasi-resonant module and a switching tube. The quasi-resonant system comprises: a quasi-resonant device according to the first aspect of the present disclosure; an error amplifier, configured to amplify an error of the feedback signal to obtain an amplified error signal; a first control module, connected with the error amplifier, and configured to control the quasi-resonant system to work under a constant voltage and a constant current; a second control module, connected with the quasi-resonant device and the first control module respectively, and configured to control the quasi-resonant device to perform a PFM when the quasi-resonant system is working under the constant current, and to perform a PWM according to the amplified error signal when the quasi-resonant system is working under the constant voltage, so as to perform a quasi-resonant control in an operation mode with a preset load; a driving module, connected with the second control module, and configured to drive the switching tube to be turned on or turned off; and a start module, configured to start the quasi-resonant system.

With the quasi-resonant system according to embodiments of the present disclosure, a zero-voltage switching can be realized, which improves the switching efficiency and improves the effect of EMI. In addition, a valley turn-on may be performed after the time T, so the frequency may not be affected by the input voltage; and when the quasi-resonant system is applied to a suitable load, the load may have little influence on the frequency. In this way, a quasi rated frequency may be realized, and problems of the switching loss and the noise caused by a high frequency can be also avoided.

According to a third aspect of the present disclosure, a method for a quasi-resonant control of a switching power is provided. The method comprises: sampling a degaussing time $T_{ds}$ of a secondary coil of a transformer when a switching tube in a quasi-resonant module of the switching power is turned off, sending the degaussing time $T_{ds}$ of the secondary coil of the transformer to a time producing module, and judging if there is a valley so as to obtain a resonant valley signal; producing a time T signal with a predetermined ratio; and processing the resonant valley signal and the time T signal to obtain a switching signal T' used to turn on the switching tube in the quasi-resonant module of the switching power.

With the method for the quasi-resonant control of the switching power according to embodiments of the present disclosure, the switching efficiency and the effect of EMI are improved, and the manufacturing cost is significantly reduced. In addition, the method is convenient in control and easy for operation.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
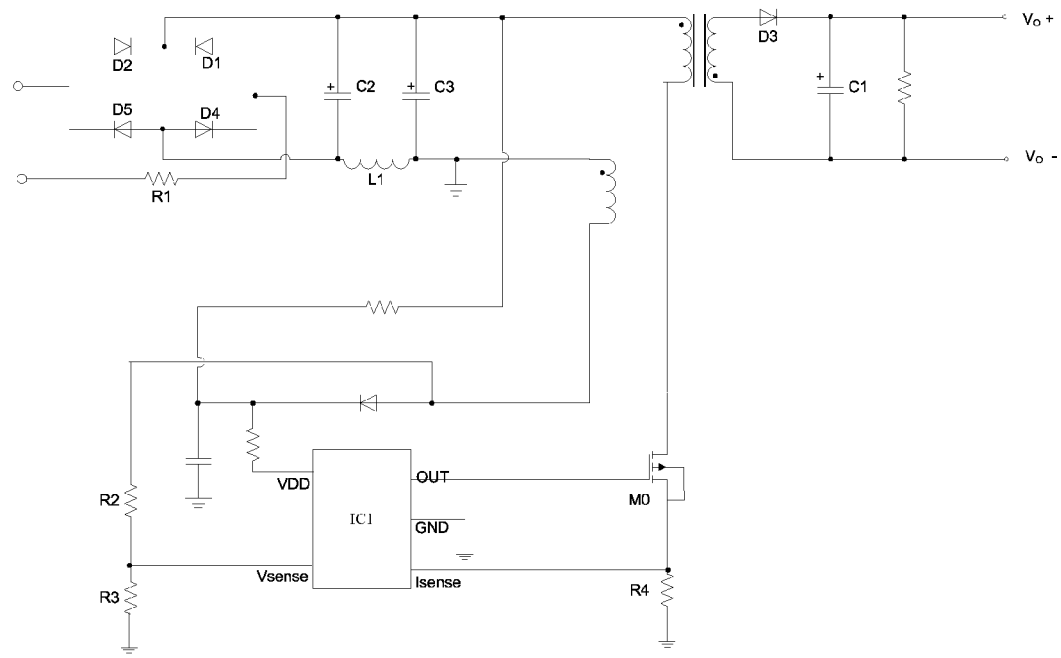
FIG. 1 is a circuit diagram illustrating an adaptor of a typical primary control switching power in the prior art.
Figure 2:
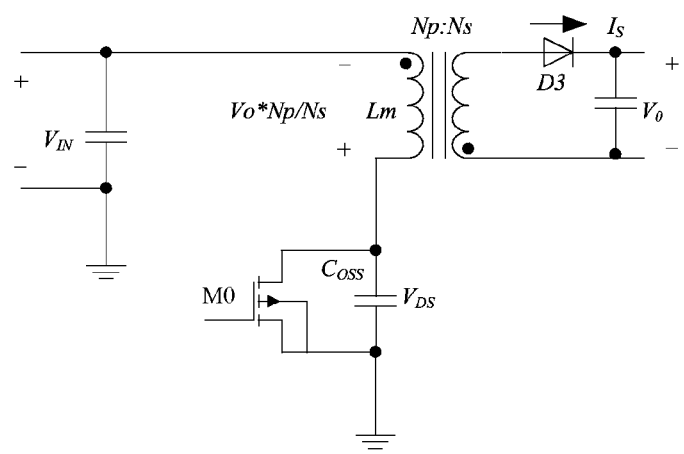
FIG. 2 is a schematic circuit diagram illustrating a quasi-resonant module in the prior art.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

Terms concerning attachments, coupling and the like, such as "connected", refer to a relationship in which structures are secured or attached to one another either directly or indirectly through intervening structures, as well as both movable or rigid attachments or relationships, unless expressly described otherwise. Unless specified or limited otherwise, the terms "connected" and variations thereof are used broadly and encompass both direct and indirect mountings, connections, supports, and couplings. Further, "connected" are not restricted to physical or mechanical connections.

Additional aspects and advantages of the embodiments of the present disclosure will be given in part in the following descriptions, become apparent in part from the following descriptions, or be learned from the practice of the embodiments of the present disclosure.

Referring to FIGS. 4-9, a quasi-resonant device for a switching power according to a first aspect of the present disclosure will be described below.

Figure 4:
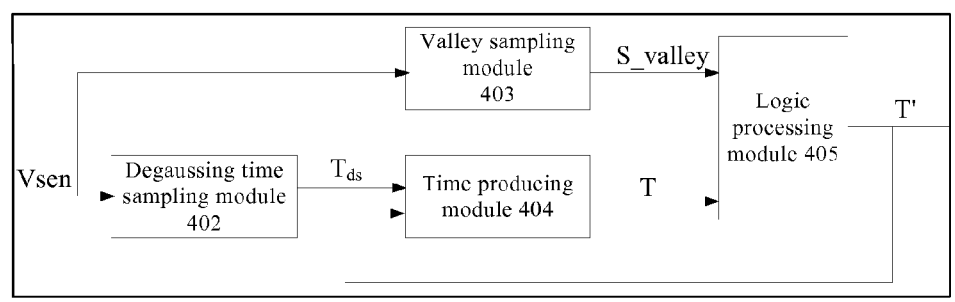
FIG. 4 is a block diagram of a quasi-resonant device for a switching power according to embodiments of the present disclosure.

In one embodiment of the present disclosure, as shown in FIG. 4, the quasi-resonant device comprises a degaussing time sampling module 402, a valley sampling module 403, a time producing module 404, and a logic processing module 405.

In some embodiments, the degaussing time sampling module 402 is configured to sample a degaussing time $T_{ds}$ of a secondary coil of the transformer according to a feedback signal $V_{sen}$ output by the switching power after the switching tube (e.g., an MOS tube M0) is turned off.

Figure 5:
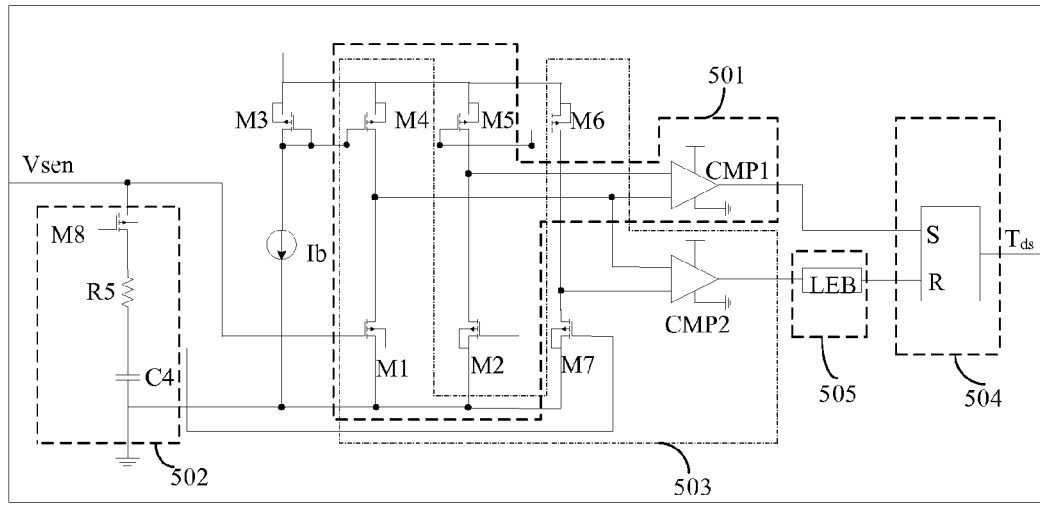
FIG. 5 is a circuit diagram of a degaussing time sampling module in a quasi-resonant device for a switching power according to embodiments of the present disclosure.

Specifically, in one embodiment of the present disclosure, the degaussing time sampling module 402 comprises a first comparison network unit 501, a switching capacitance sampling unit 502, a second comparison network unit 503 and a trigger unit 504, as shown in FIG. 5. The first comparison network unit 501 comprises MOS tubes M1, M2, M4, M5 as well as a two-level comparator CMP1, and configured to compare the feedback signal $V_{sen}$ output by the switching power with a zero potential so as to obtain a start signal for starting degaussing the secondary coil of the transformer, and to send the start signal to an S terminal of a first RS trigger in the trigger unit 504. The two-level comparator CMP1 has an open loop application, and needs no effect of compensation.

In one embodiment of the present disclosure, the switching capacitance sampling unit 502 comprises: an MOS tube M8, a resistance R5 and a capacitor C4. Specifically, the switching capacitance sampling unit 502 obtains a sampled voltage on the capacitor C4, and the sampled voltage is lagged in phase compared with that of the feedback signal $V_{sen}$ because of a RC delay, i.e. the switching capacitance sampling unit 502 is configured to delay the feedback signal $V_{sen}$ so as to obtain a phase-lag sampled voltage.

In one embodiment of the present disclosure, the second comparison network unit 503 is connected with the switching capacitance sampling unit 502, and comprises MOS tubes M1, M7, M4, M6, and a comparator CMP2. The second comparison network unit 503 is configured to compare the feedback signal $V_{sen}$ with the phase-lag sampled voltage so as to obtain a stop signal for stopping degaussing the secondary coil of the transformer, and to send the stop signal to a R terminal of the first RS trigger in the trigger unit 504. The comparator CMP2 is a self-offset comparator, which is capable of rotating when smaller differential mode is input into the comparator CMP2, and thus a turning point of the feedback signal $V_{sen}$ can be determined so as to obtain the stop signal for stopping degaussing the secondary coil of the transformer. In one embodiment of the present disclosure, the self-offset comparator CMP2 is configured to compare the feedback signal with the phase-lag sampled voltage to determine the turning point of the feedback signal, then the second comparison 503 is further configured to obtain the stop signal according to the turning point.

In one embodiment of the present disclosure, the trigger unit 504 is connected with the first comparison network unit 501 and the second comparison network units 503 respectively, and configured to obtain the degaussing time $T_{ds}$ of the secondary coil of the transformer according to the start signal and the stop signal.

In one embodiment of the present disclosure, the degaussing time sampling module 402 further comprises a first blanking circuit unit 505, i.e. a blanking circuit LEB. The first blanking circuit unit 505 is connected with the second comparison network unit 503 and the trigger unit 504 respectively, and configured to process the stop signal for stopping degaussing the secondary coil of the transformer so as to obtain an ascending edge of a wave of the stop signal.

In some embodiments of the present disclosure, the degaussing time $T_{ds}$ of the secondary coil of the transformer is determined according to a formula of:

$$T_{ds} = L_s * \frac{I_s}{V_o + V_f}, \text{ where} \quad (1)$$

$$I_s = \frac{N_p}{N_s} * I_p, L_s = \frac{L_p}{\left(\frac{N_p}{N_s}\right)^2},$$

$L_p$ is an inductance of a primary coil of the transformer, $I_p$ is a peak current of the primary coil of the transformer, $N_s$ is a number of turns of the secondary coil of the transformer, $N_p$ is a number of turns of the primary coil of the transformer, $V_o$ is an output voltage, and $V_f$ is a voltage drop of an output diode.

Referring to FIG. 4, the valley sampling module 403 is configured to sample a resonant valley signal S_valley of the quasi-resonant module according to the feedback signal $V_{sen}$.

Figure 6:
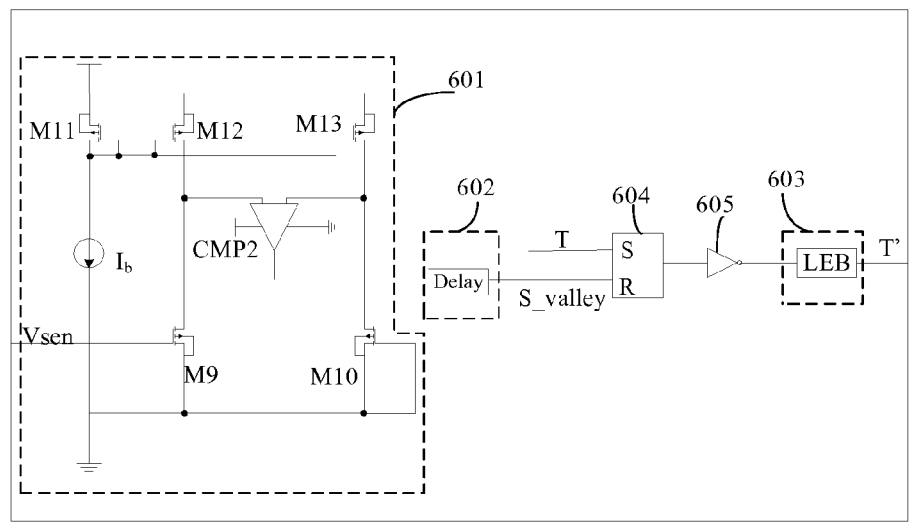
FIG. 6 is a circuit diagram of a valley sampling module and a logic processing module in a quasi-resonant device for a switching power according to embodiments of the present disclosure.

Specifically, in one embodiment of the present disclosure, the valley sampling module 403 comprises a three-level comparator 601 and a delay unit 602, as shown in FIG. 6. The three-level comparator 601 comprises an bias current source $I_b$, MOS tubes M9, M10, M11, M12, M13, and a two-level comparator CMP2, and is configured to compare the feedback signal $V_{sen}$ with the zero potential to output an output signal and sample a resonant center of the output signal. The delay unit 602 is connected with the three-level comparator 601 and configured to delay the output signal of the three-level comparator 601 according to the resonant center so as to obtain the resonant valley signal S_valley.

Specifically, in one embodiment, the three-level comparator 601 has two input terminals connected with the voltage output terminal (outputting the feedback signal $V_{sen}$) of the switching power and the zero potential respectively. By comparing the feedback signal $V_{sen}$ with the zero potential and sampling the resonant center of the output signal, because there remains a distance of about ¼ resonant period between the resonant center and the valley, the output signal of the three-level comparator 601 is delayed to obtain the resonant valley signal S_valley.

As shown in FIG. 4, in some embodiments, the time producing module 404 is connected with the degaussing time sampling module 402, and configured to produce a time T with a predetermined ratio D by processing the degaussing time $T_{ds}$ of the secondary coil of the transformer.

In some embodiments, the time T is determined according to a formula of:

$$T=D*T_{ds} \quad (2)$$

where the predetermined ratio D is a constant greater than 1.

Figure 7:
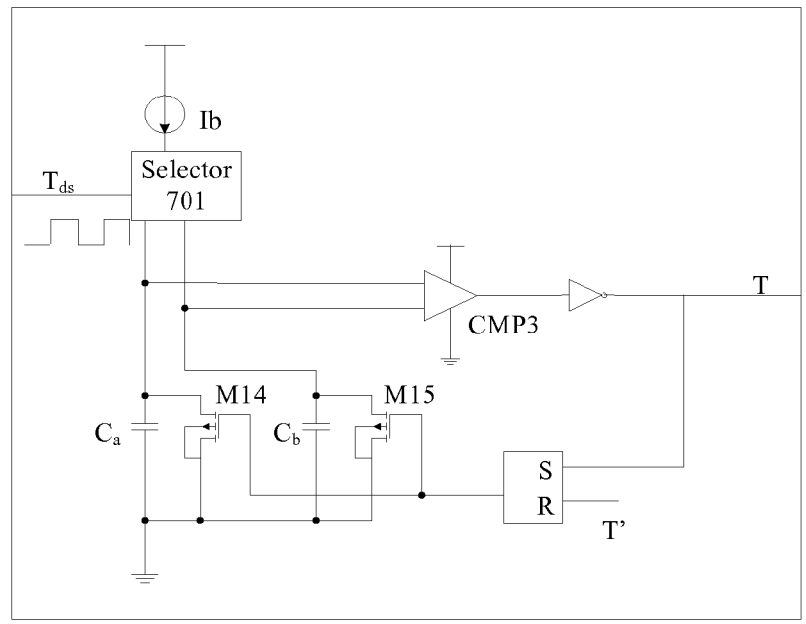
FIG. 7 is a circuit diagram of a time producing module in a quasi-resonant device for a switching power according to embodiments of the present disclosure.

In one embodiment of the present disclosure, as shown in FIG. 7, the time producing module 404 comprises a first capacitor $C_a$, a second capacitor $C_b$, a selector 701, MOS tubes M14, M15, and a two-level comparator CMP3.

The predetermined ratio D is determined according to a current capacitance $C_1$ of the first capacitor $C_a$ and a current capacitance $C_2$ of the second capacitor $C_b$, and can be determined by a formula of:

$$\frac{C_1}{C_1+C_2}=1-\frac{1}{D} \quad (3)$$

where $C_1$ is the current capacitance of the first capacitor, and $C_2$ is the current capacitance of the second capacitor.

The selector 701 is connected with the first capacitor $C_a$ and the second capacitor $C_b$ respectively, and configured to: select a predetermined current to charge the first capacitor $C_a$ and the second capacitor $C_b$ respectively under the control of the degaussing time $T_{ds}$ of the secondary coil of the transformer, and control to output a time T signal with the predetermined ratio D after voltages of the first capacitor $C_a$ and the second capacitor $C_b$ are compared.

Figure 8:
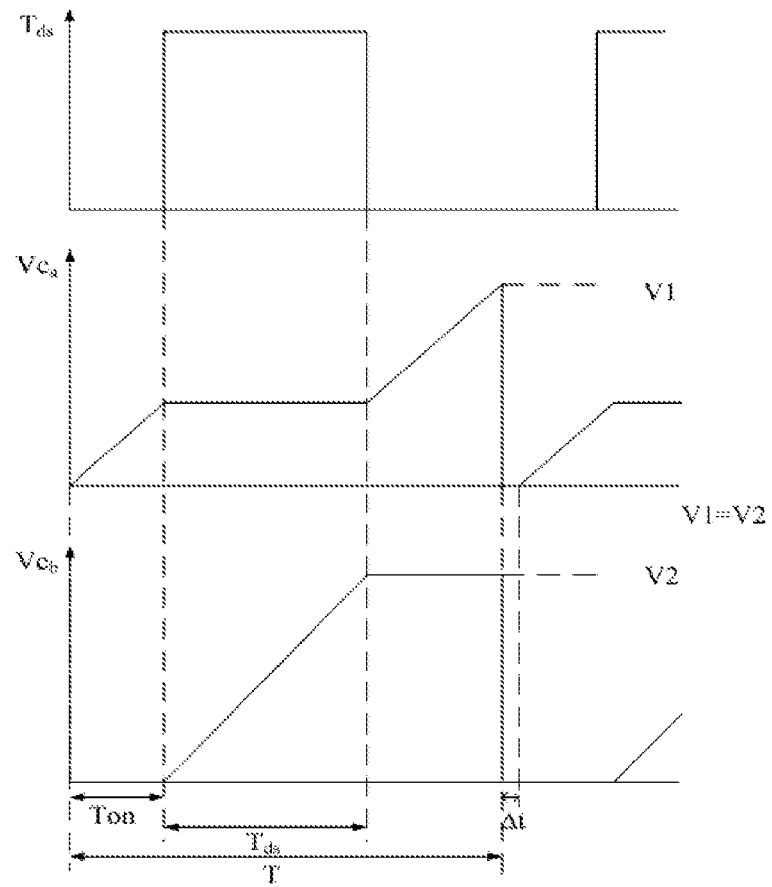
FIG. 8 is a wave diagram of an operation voltage of a ratio capacitor in a time producing module in a quasi-resonant device for a switching power according to embodiments of the present disclosure.

Specifically, in some embodiments, the degaussing time $T_{ds}$ controls the selector 701 to select a fixed current $I_b$ to charge the first capacitor $C_a$ and the second capacitor $C_b$ respectively, the selector 701 generates the time T signal with the predetermined ratio D after voltages of the first capacitor $C_a$ and the second capacitor $C_b$ are compared, and then the time T signal is latched by a second RS trigger so as to output the switching signal T'. The MOS tubes M14, M15 are configured to initialize and reset the first capacitor $C_a$ and the second capacitor $C_b$. Waves of operation voltages $Vc_a$, $Vc_b$ of the first capacitor $C_a$ and the second capacitor $C_b$ are shown in FIG. 8. During a turn-on time Ton of the MOS tube M0, the time T signal is in a low level, and the selector 701 selects the bias current $I_b$ to charge the first capacitor $C_a$. After Ton, the time T signal is in a high level, a voltage of the first capacitor $C_a$ is kept, and the selector 701 selects the bias current $I_b$ to charge the second capacitor $C_b$. After $T_{ds}$, a voltage of the second capacitor $C_b$ increases to V2 and V2 is kept, and then the first capacitor $C_a$ is charged again. When the voltage of the first capacitor $C_a$ reaches a level of V1=V2 (or V1 is slightly larger than V2), the two-level comparator CMP3 rotates, the time T signal is output and the first capacitor $C_a$ and the second capacitor $C_b$ are reset until a next Ton starts. The above operation process is repeated.

In some embodiments, as shown in FIG. 4, the logic processing module 405 is connected with the valley sampling module 403 and the time producing module 404 respectively and configured to obtain a first valley signal after the time T, and the first valley signal works as the switching signal T' to turn on the switching tube (such as the MOS tube M0).

In one embodiment of the present disclosure, as shown in FIG. 6, the logic processing module 405 comprises a second blanking circuit unit 603, a third RS trigger 604, and a phase reverser 605. The second blanking circuit unit 603 is configured to process the first valley signal obtained after the time T, so as to obtain an ascending edge of a wave of the first valley signal.

Specifically, as shown in FIG. 6, the time T signal and the resonant valley signal S_valley is latched by the third RS trigger 604 to obtain a time signal starting from the T signal to the S_valley signal, the time signal is reversed by the phase reverser 605 to obtain a reversed time signal, and an ascending edge of the reversed time signal works as the switching signal T' for turning on the MOS tube M0, thus ensuring that the first resonant valley outputs the switching signal T' after the time T.

The actual operation process of the quasi-resonant device for the switching power according to embodiments of the present disclosure will be described in details below.

Figure 9:
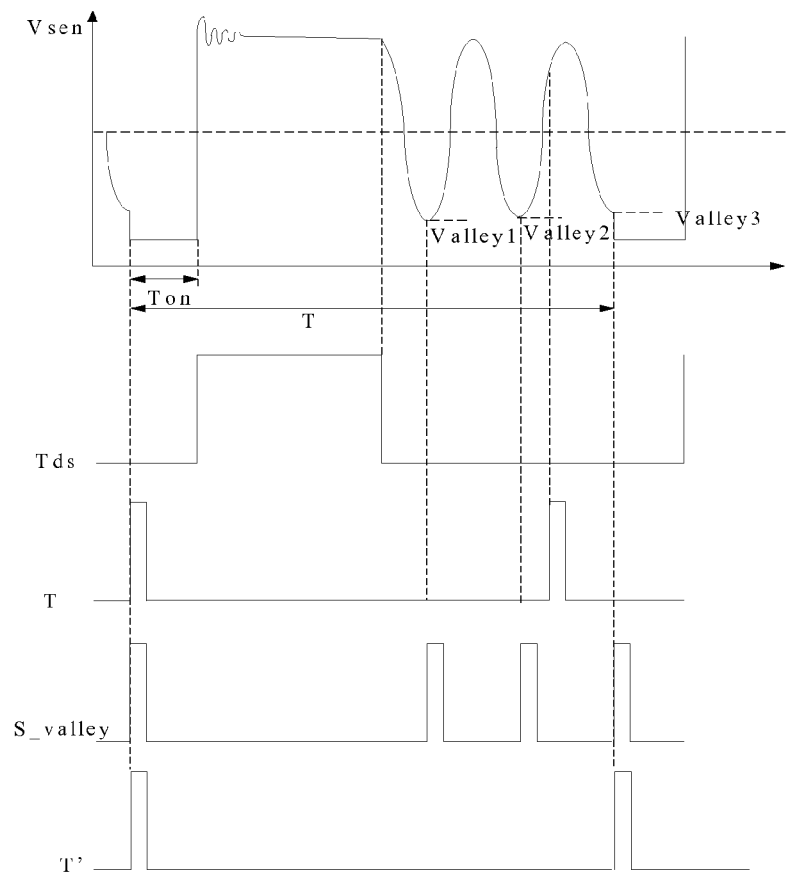
FIG. 9 is a time sequence diagram illustrating an operation logic of a quasi-resonant device for a switching power according to embodiments of the present disclosure.

Firstly, when the MOS tube M0 in the quasi-resonant module is turned off, the primary coil of the transformer starts to release energy to the secondary coil of the transformer and the secondary coil of the transformer starts to degauss, and the degaussing time $T_{ds}$ of the secondary coil of the transformer is sampled by the degaussing time sampling module 402 and sent to the time producing module 404. The time producing module 404 processes $T_{ds}$ after $T_{ds}$ is received and generates the time T (T=D*$T_{ds}$). The valley sampling module 403 samples the resonant valley signal S_valley and sends the resonant valley signal S_valley to the logic processing module 405. The logic processing module 405 performs a logic processing for the resonant valley signal S_valley and the T signal, thus ensuring that the first resonant valley outputs the switching signal T' after the time T. Referring to FIG. 9, a time sequence diagram illustrates the operation logic of each signal of the quasi-resonant device, in which $V_{sen}$ is a voltage wave of the feedback signal output by the voltage output terminal of the switching power, $T_{ds}$ is the degaussing time of the secondary coil of the transformer, the T signal is the time signal after processed by the time producing module, the period of the T signal is D times as large as $T_{ds}$, S_valley is the resonant valley signal, and T' is the switching signal finally output for turning on the MOS tube M0 (i.e. the first valley signal after the time T).

The quasi-resonant device according to embodiments of the present disclosure is capable of realizing a valley sampling. In addition, with the quasi-resonant device, the time T is generated by the time producing module, and the first resonant valley after the time T may turn on the switching tube. In this way, the switching tube (e.g., the MOS tube M0) is turned on when the voltage $V_{DS}$ between two terminals of the switching tube is minimum, i.e. the ZVS or LVS can be realized, so that the switching loss caused by the capacitance between the drain and the source can be avoided, the switching efficiency is improved, and the EMI effect is improved due to smaller voltage change rate. Further, as the number of the external filters is reduced, the manufacturing cost is reduced significantly.

Figure 10:
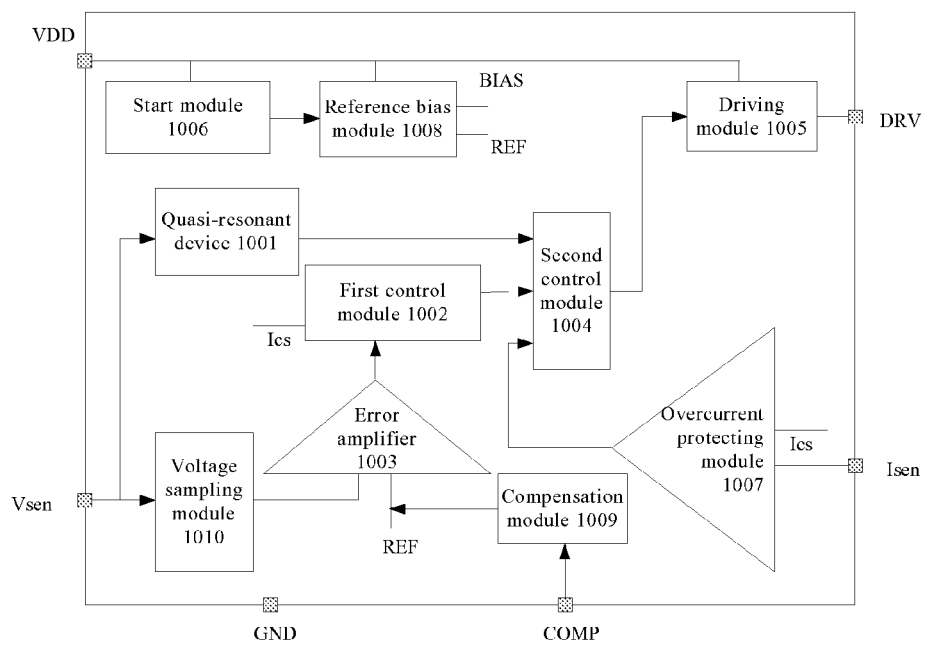
FIG. 10 is a block diagram illustrating a quasi-resonant system for a switching power according to embodiments of the present disclosure.
Figure 11:
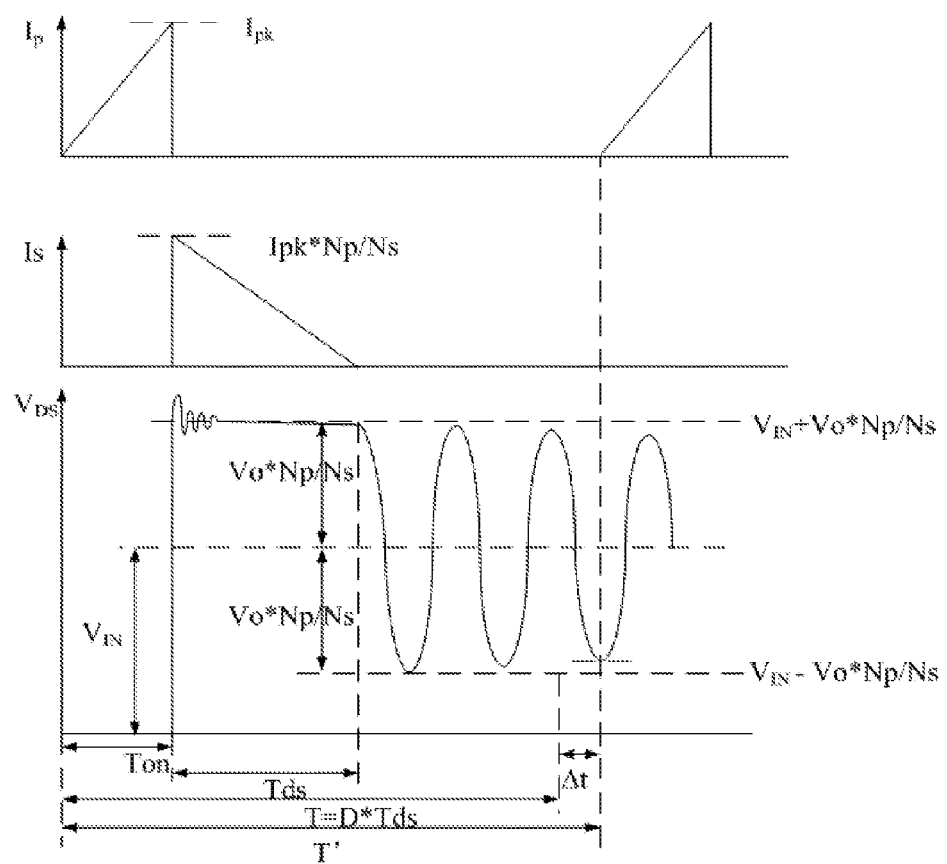
FIG. 11 is a wave diagram of each node during an operation progress of a quasi-resonant system for a switching power according to embodiments of the present disclosure.

Referring to FIGS. 10-11, a quasi-resonant system for a switching power according to embodiments of the present disclosure will be described in details below.

As shown in FIG. 10, in some embodiments, the quasi-resonant system comprises: a quasi-resonant device 1001 described above, a first control module 1002, an error amplifier 1003, a second control module 1004, a driving module 1005, and a start module 1006.

The error amplifier 1003 is configured to amplify an error of the feedback signal to obtain an amplified error signal. The first control module 1002 is connected with the error amplifier 1003, and configured to control the quasi-resonant system to work under a constant voltage and a constant current. The second control module 1004 is connected with the quasi-resonant device 1001 and the first control module 1002 respectively, and configured to control the quasi-resonant device 1001 to perform a PFM when the quasi-resonant system is working under the constant current, and to perform a PWM according to the amplified error signal when the quasi-resonant system is working under the constant voltage, so as to perform a quasi-resonant control in an operation mode with a preset load. The driving module 1005 is connected with the second control module 1004, and configured to drive the switching tube (e.g., the MOS tube M0) to be turned on or turned off. The start module 1006 is configured to start the quasi-resonant system.

In one embodiment of the present disclosure, the quasi-resonant system further comprises a voltage sampling module 1010 connected with the error amplifier 1003, and an overcurrent protecting module 1007 connected with the second control module 1004. The voltage sampling module 1010 is configured to sample the feedback signal $V_{sen}$ to get a sampled feedback signal and provide the sampled feedback signal to the error amplifier 1003. A current $I_{cs}$ is supplied from an $I_{sen}$ terminal of the overcurrent protecting module 1007, and the overcurrent protecting module 1007 is configured to perform an overcurrent protection for the quasi-resonant system.

In one embodiment of the present disclosure, the quasi-resonant system further comprises a reference bias module 1008 and a compensation module 1009, as shown in FIG. 10. The reference bias module 1008 is configured to provide a reference REF and a bias BIAS to an internal circuit.

Pins of the quasi-resonant system are illustrated below.
VDD—external power terminal;
GND—ground terminal;
COMP—interface terminal for connecting compensation capacitor;
$I_{sen}$—terminal for detecting peak current;
$V_{sen}$—terminal for feeding back output voltage;
DRV—output driving terminal.

Figure 3:
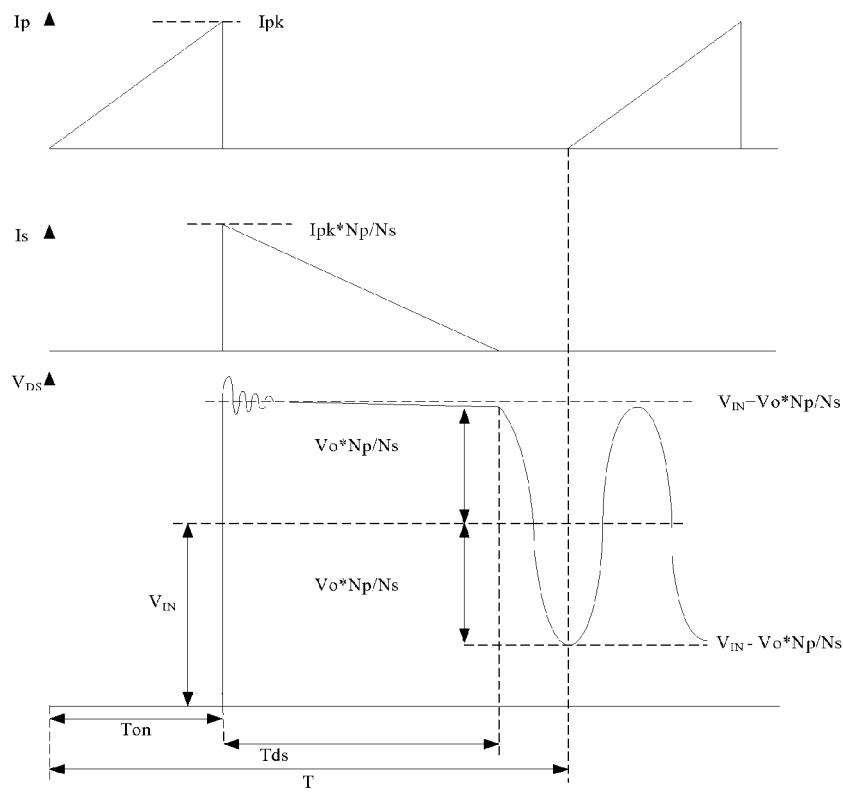
FIG. 3 is a wave diagram of each node during the operating progress of the quasi-resonant module in FIG. 2.

In some embodiments, the degaussing time sampling module 402 in the quasi-resonant device 1001 of the quasi-resonant system samples the degaussing time $T_{ds}$ of the secondary coil of the transformer, the time producing module 404 in the quasi-resonant device 1001 produces a time T ($T=D*T_{ds}$) with a predetermined ratio D, the valley sampling module 403 in the quasi-resonant device 1001 samples the resonant valley to obtain a sampled resonant valley, and the first sampled resonant valley turns on the MOS tube M0 after the time T. With reference to FIG. 3, waves of each node are shown in FIG. 11. In that way, when the quasi-resonant system is working under the constant current, the quasi-resonant device 1001 is controlled to perform a PFM, and the switching period of the MOS tube M0 can be determined by the following formula:

$$T'=T+\Delta t=D*T_{ds}+\Delta t \qquad (4)$$

where the degaussing time $T_{ds}$ of the secondary coil of the transformer is determined according to formula (1).

Thus, the switching signal T' of the MOS tube M0 is determined according to a formula of:

$$T' = D*L_p*I_p* \frac{N_s}{(V_o+V_f)*N_p} + \Delta t \qquad (5)$$

where D is the predetermined ratio, $L_p$ is an inductance of a primary coil of the transformer, $I_p$ is a peak current of the primary coil of the transformer, $N_s$ is a number of turns of the secondary coil of the transformer, $N_p$ is a number of turns of the primary coil of the transformer, $V_o$ is an output voltage, $V_f$ is a voltage drop of an output diode, and $\Delta t$ is a time between outputs of the T signal and the switching signal T'. As most the parameters are predetermined, the main parameters that will influence the operation frequency are the peak current $I_p$ of the primary coil of the transformer and the output voltage $V_o$. Thus, the increase in the input voltage may not influence the operation frequency. Further, when the quasi-resonant system is applied to a suitable load, the load may have little influence on the operation frequency. In other words, with the decrease of the output voltage $V_o$, the operation period is increased and the operation frequency is reduced.

In some embodiments, when the quasi-resonant system is working under the constant voltage, the quasi-resonant device 1001 is controlled to perform a PWM according to the amplified error signal. Specifically, the voltage sampling module 1010 samples the feedback signal $V_{sen}$ to get a sampled feedback signal and sends the sampled feedback signal to the error amplifier 1003, the error amplifier 1003 performs an error amplification for the sampled feedback signal and outputs an amplified error signal to the first control module 1002, and then the second control module 1004 connected with the first control module 1002 controls the quasi-resonant device 1001 to perform the quasi-resonant control (such as PWM) according to the amplified error signal.

The output power $P_o$ is determined according to a formula of:

$$P_o=0.5*L_p*I_p^2*f*\eta$$

where $P_o$ is the output power, $L_p$ is an inductance of a primary coil of the transformer, $I_p$ is a peak current of the primary coil of the transformer, f is an operation frequency of the switching tube, and $\eta$ is a conversion efficiency between an input and an output.

Referring to the above formula, when the load is reduced, $I_p$ and the period T' decrease but the operation frequency increases. Therefore, when the quasi-resonant system is applied to a heavy load, the load has very little influence on the operation frequency.

With the quasi-resonant system according to embodiments of the present disclosure, a zero-voltage switching can be realized, which improves the switching efficiency and improves the effect of EMI. In addition, a valley turn-on may be performed after the time T, so the frequency may not be affected by the input voltage; and when the quasi-resonant system is applied to a suitable load, the load may have little influence on the frequency. In this way, a quasi rated frequency may be realized, and problems of the switching loss and the noise caused by a high frequency can be also avoided.

Figure 12:
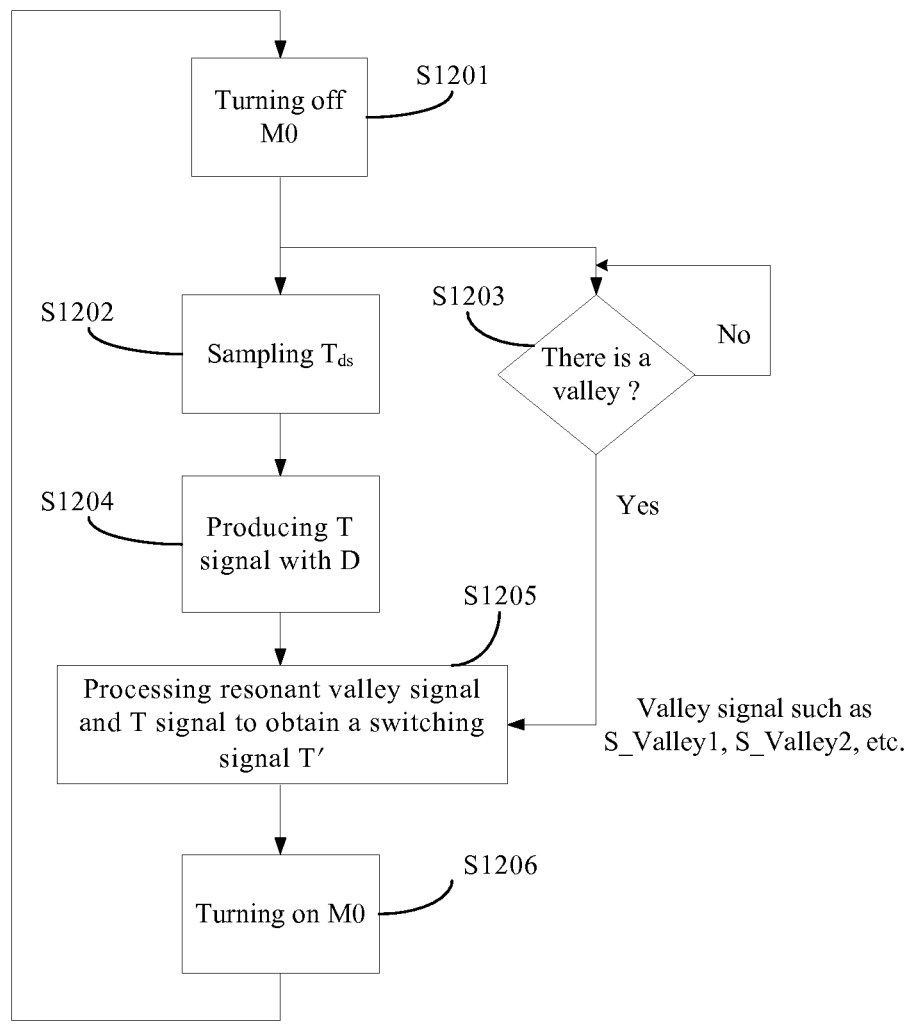
FIG. 12 is a flow chart showing a method for a quasi-resonant control of a switching power according to embodiments of the present disclosure.

As shown in FIG. 12, a method for a quasi-resonant control of a switching power according to embodiments of the present disclosure will be described in details below.

According to a third aspect of the present disclosure, a method for a quasi-resonant control of a switching power is provided. The method comprises: sampling a degaussing time $T_{ds}$ of a secondary coil of a transformer when a switching tube in a quasi-resonant module of the switching power is turned off, sending the degaussing time $T_{ds}$ of the secondary coil of the transformer to a time producing module, and judging if there is a valley so as to obtain a resonant valley signal; producing a time T signal with a predetermined ratio; and processing the resonant valley signal and the time T signal to obtain a switching signal T' used to turn on the switching tube in the quasi-resonant module of the switching power.

In one embodiment of the present disclosure, the method comprises the following steps.

Step S1201, the switching tube, such as the MOS tube M0 is turned off.

Step S1202, $T_{ds}$ is sampled.

Step S1203, it is judged if there is a valley, if no, Step S1203 is performed; and if yes, Step S1205 is performed. In one embodiment, a valley can be judge if there is any valley signal, such as S_Valley 1 or S_Valley 2 as shown in the drawings. Specifically, in some embodiments, when the switching tube in the quasi-resonant module is turned off, the degaussing time sampling module samples the degaussing time $T_{ds}$ of the secondary coil of the transformer, and sends the degaussing time $T_{ds}$ to the time producing module, and then it is judged whether there is a valley so as to obtain a resonant valley signal.

Step S1204, a time T signal with a predetermined ratio is produced. In some embodiments, the time producing module produces a time T signal with a predetermined ratio D.

Step S1205, the resonant valley signal and the time T signal are processed to obtain the switching signal T'. In some embodiments, the logic processing module performs a logic operation for the valley sampling signal S_valley and the T signal after receiving the same, thus ensuring the first resonant valley after the time T outputs the switching signal T'.

Step S1206, the switching tube is turned on.

The above steps are repeated.

According to an embodiment of the present disclosure, when the switching tube (such as the MOS tube M0) in the quasi-resonant module of the switching power is turned off, the primary coil of the transformer releases energy to the secondary coil of the transformer and the secondary coil starts to degauss, and the degaussing time sampling module samples the degaussing time $T_{ds}$ during the degaussing time $T_{ds}$ of the secondary coil of the transformer.

With the method for the quasi-resonant control of the switching power according to embodiments of the present disclosure, the switching efficiency and the effect of EMI are improved, and the manufacturing cost is significantly reduced. In addition, the method is convenient in control and easy for operation.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar 153 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but not limited to read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A quasi-resonant device for a switching power comprising a transformer, a quasi-resonant module and a switching tube, comprising:
   a degaussing time sampling module, configured to sample a degaussing time $T_{ds}$ of a secondary coil of the transformer according to a feedback signal output by the switching power after the switching tube is turned off;
   a valley sampling module, connected with the degaussing time sampling module, and configured to sample a resonant valley signal of the quasi-resonant module according to the feedback signal;
   a time producing module, connected with the degaussing time sampling module, and configured to produce a time T with a predetermined ratio D by processing the degaussing time $T_{ds}$; and
   a logic processing module, connected with the valley sampling module and the time producing module respectively, and configured to obtain a first valley signal after the time T, wherein the first valley signal works as a switching signal T' to turn on the switching tube.

2. The quasi-resonant device according to claim 1, wherein the degaussing time sampling module comprises:
   a first comparison network unit, configured to compare the feedback signal with a zero potential so as to obtain a start signal for starting degaussing the secondary coil of the transformer;
   a switching capacitance sampling unit, configured to delay the feedback signal so as to obtain a phase-lag sampled voltage;
   a second comparison network unit, connected with the switching capacitance sampling unit, and configured to compare the feedback signal with the phase-lag sampled voltage, so as to obtain a stop signal for stopping degaussing the secondary coil of the transformer; and
   a trigger unit, connected with the first comparison network unit and the second comparison network unit respectively, and configured to obtain the degaussing time $T_{ds}$ of the secondary coil of the transformer according to the start signal and the stop signal.

3. The quasi-resonant device according to claim 2, wherein the degaussing time sampling module further comprises:
   a first blanking circuit unit, connected with the second comparison network unit and the trigger unit respectively, and configured to process the stop signal so as to obtain an ascending edge of a wave of the stop signal.

4. The quasi-resonant device according to claim 2, wherein the second comparison network unit comprises a self-offset comparator configured to determine a turning point of the feedback signal according to a comparison between the feedback signal and the phase-lag sampled voltage, and is further configured to obtain the stop signal according to the turning point.

5. The quasi-resonant device according to claim 2, wherein the degaussing time $T_{ds}$ of the secondary coil of the transformer is determined according to a formula of:

$$T_{ds} = L_s * \frac{I_s}{V_o + V_f}, \text{ where}$$

$$I_s = \frac{N_p}{N_s} * I_p, L_s = \frac{L_p}{\left(\frac{N_p}{N_s}\right)^2},$$

$L_p$ is an inductance of a primary coil of the transformer, $I_p$ is a peak current of the primary coil of the transformer, $N_s$ is a number of turns of the secondary coil of the transformer, $N_p$ is a number of turns of the primary coil of the transformer, $V_o$ is an output voltage, and $V_f$ is a voltage drop of an output diode.

6. The quasi-resonant device according to claim 1, wherein the time T is determined according to a formula of:

$$T = D * T_{ds}$$

where the predetermined ratio D is a constant greater than 1.

7. The quasi-resonant device according to claim 6, wherein the time producing module comprises:
   a first capacitor and a second capacitor, in which the predetermined ratio D is determined according to the first capacitor and the second capacitor; and
   a selector, connected with the first capacitor and the second capacitor respectively, and configured to: select a predetermined current to charge the first capacitor and the second capacitor respectively under a control of the degaussing time $T_{ds}$ of the secondary coil of the transformer, and control to output a time T signal with the predetermined ratio D after voltages of the first capacitor and the second capacitor are compared.

8. The quasi-resonant device according to claim 7, wherein the predetermined ratio D is determined according to a formula of:

$$\frac{C_1}{C_1 + C_2} = 1 - \frac{1}{D}$$

where $C_1$ is a current capacitance of the first capacitor, and $C_2$ is a current capacitance of the second capacitor.

9. The quasi-resonant device according to claim 1, wherein the valley sampling module comprises:
   a three-level comparator, configured to compare the feedback signal with the zero potential to output an output signal and sample a resonant center of the output signal; and
   a delay unit, connected with the three-level comparator, and configured to delay the output signal according to the resonant center so as to obtain the resonant valley signal.

10. The quasi-resonant device according to claim 1, wherein the logic processing module comprises:
- a second blanking circuit unit, configured to process the first valley signal obtained after the time T, so as to obtain an ascending edge of a wave of the first valley signal.

11. A quasi-resonant system for a switching power comprising a transformer, a quasi-resonant module and a switching tube, comprising:
- a quasi-resonant device comprising: a degaussing time sampling module, configured to sample a degaussing time $T_{ds}$ of a secondary coil of the transformer according to a feedback signal output by the switching power after the switching tube is turned off; a valley sampling module, connected with the degaussing time sampling module, and configured to sample a resonant valley signal of the quasi-resonant module according to the feedback signal; a time producing module, connected with the degaussing time sampling module, and configured to produce a time T with a predetermined ratio D by processing the degaussing time $T_{ds}$; and a logic processing module, connected with the valley sampling module and the time producing module respectively, and configured to obtain a first valley signal after the time T, wherein the first valley signal works as a switching signal T' to turn on the switching tube;
- an error amplifier, configured to amplify an error of the feedback signal to obtain an amplified error signal;
- a first control module, connected with the error amplifier, and configured to control the quasi-resonant system to work under a constant voltage and a constant current;
- a second control module, connected with the quasi-resonant device and the first control module respectively, and configured to control the quasi-resonant device to perform a PFM when the quasi-resonant system is working under the constant current, and to perform a PWM according to the amplified error signal when the quasi-resonant system is working under the constant voltage, so as to perform a quasi-resonant control in an operation mode with a preset load;
- a driving module, connected with the second control module, and configured to drive the switching tube to be turned on or turned off; and
- a start module, configured to start the quasi-resonant system.

12. The quasi-resonant system according to claim 11, further comprising:
- a voltage sampling module, connected with the error amplifier, and configured to sample the feedback signal to get a sampled feedback signal and provide the sampled feedback signal to the error amplifier, and
- an overcurrent protecting module, connected with the second control module, and configured to perform an overcurrent protection for the quasi-resonant system.

13. The quasi-resonant system according to claim 11, wherein the quasi-resonant device is controlled to perform the PFM when the quasi-resonant system is working under the constant current, and the switching signal T' is determined according to a formula of:

$$T' = D * L_p * I_p * \frac{N_s}{(V_o + V_f) * N_p} + \Delta t$$

where $L_p$ is an inductance of a primary coil of the transformer, $I_p$ is a peak current of the primary coil of the transformer, $N_s$ is a number of turns of the secondary coil of the transformer, $N_p$ is a number of turns of the primary coil of the transformer, $V_o$ is an output voltage, $V_f$ is a voltage drop of an output diode, and $\Delta t$ is a time between outputs of the T signal and the switching signal T'.

14. The quasi-resonant system according to claim 11, wherein the quasi-resonant device is controlled to perform the PWM according to the amplified error signal when the quasi-resonant system is working under the constant voltage, and an output power $P_o$ is determined according to a formula of:

$$P_o = 0.5 * L_p * I_p^2 * f * \eta$$

where $L_p$ is an inductance of a primary coil of the transformer, $I_p$ is a peak current of the primary coil of the transformer, f is an operation frequency of the switching tube, and $\eta$ is a conversion efficiency between an input and an output.

15. A method for a quasi-resonant control of a switching power, comprising:
- sampling a degaussing time $T_{ds}$ of a secondary coil of a transformer when a switching tube in a quasi-resonant module of the switching power is turned off, sending the degaussing time $T_{ds}$ to a time producing module, and judging if there is a valley so as to obtain a resonant valley signal;
- producing a time T signal with a predetermined ratio; and
- processing the resonant valley signal and the time T signal to obtain a switching signal T' used to turn on the switching tube.

16. The method according to claim 15, further comprising:
- when the switching tube is turned off, a primary coil of the transformer releasing energy to the secondary coil of the transformer, and the secondary coil of the transformer starting to degauss.

* * * * *